United States Patent
Herron et al.

(10) Patent No.: US 8,544,243 B2
(45) Date of Patent: Oct. 1, 2013

(54) METHOD OF USING AN ACCUMULATION CONVEYOR WITH A CONTINUOUS ROUND BALER

(75) Inventors: Maynard M. Herron, Hesston, KS (US); Robert A. Matousek, Milan, IL (US); Cedric J. Blough, Moundridge, KS (US); Patrick Kendrick, Hesston, KS (US); Brian D. Olander, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/341,947

(22) Filed: Dec. 31, 2011

(65) Prior Publication Data

US 2012/0222565 A1    Sep. 6, 2012

Related U.S. Application Data

(62) Division of application No. 12/645,631, filed on Dec. 23, 2009, now Pat. No. 8,413,414.

(60) Provisional application No. 61/230,381, filed on Jul. 31, 2009.

(51) Int. Cl.
*A01F 15/07* (2006.01)
*A01F 15/10* (2006.01)

(52) U.S. Cl.
USPC ............................................. 53/430; 56/341

(58) Field of Classification Search
CPC ..... A01F 15/085; A01F 15/10; A01F 15/106; A01F 15/07; A01F 15/0705; A01F 15/0715; A01F 15/071
USPC .................... 53/430, 118, 587, 211; 56/341; 100/3, 5, 35, 40, 87, 88, 89, 189
See application file for complete search history.

(56) References Cited

U.S. PATENT DOCUMENTS

| | | | | | |
|---|---|---|---|---|---|
| 2,414,823 | A | * | 1/1947 | Luebben | 56/364 |
| 4,580,398 | A | * | 4/1986 | Bruer et al. | 56/341 |
| 4,914,900 | A | * | 4/1990 | Viaud | 56/341 |
| 5,479,766 | A | * | 1/1996 | Ransom | 56/341 |
| 6,644,006 | B1 | * | 11/2003 | Merritt et al. | 56/341 |
| 2001/0013214 | A1 | * | 8/2001 | Viaud | 53/116 |
| 2008/0271428 | A1 | * | 11/2008 | Rempe et al. | 56/341 |

FOREIGN PATENT DOCUMENTS

| | | | | | |
|---|---|---|---|---|---|
| DE | 19932336 | A1 | * | 1/2001 | |
| EP | 350514 | A1 | * | 1/1990 | 100/88 |
| EP | 1982575 | A1 | * | 10/2008 | |
| GB | 2003716 | A | * | 3/1979 | 56/341 |
| GB | 2009036 | A | * | 6/1979 | 56/341 |
| JP | 06141665 | A | * | 5/1994 | |
| JP | 2008011804 | A | * | 1/2008 | |

* cited by examiner

*Primary Examiner* — Stephen F Gerrity

(57) ABSTRACT

A continuous baler includes a round baler and an accumulation conveyor for providing crop to the round baler. The accumulation conveyor may include a conveyor belt. A controller determines an operational mode of the baler and manipulates the accumulation conveyor in response to the operational mode. For example, the controller operates the accumulation conveyor in a feed direction during a bale-forming mode of the baler and operate the conveyor from an initialized position at a slower speed in the feed direction during a non-bale-forming mode. A pickup may provide crop material to the accumulation conveyor during both bale-forming and non-bale-forming modes.

10 Claims, 10 Drawing Sheets

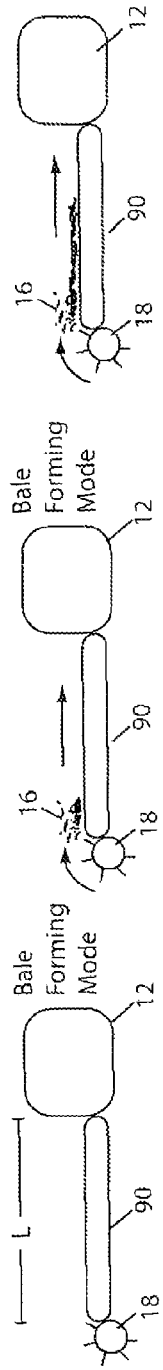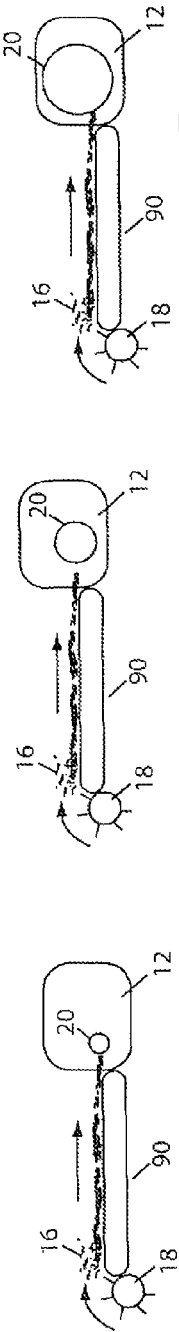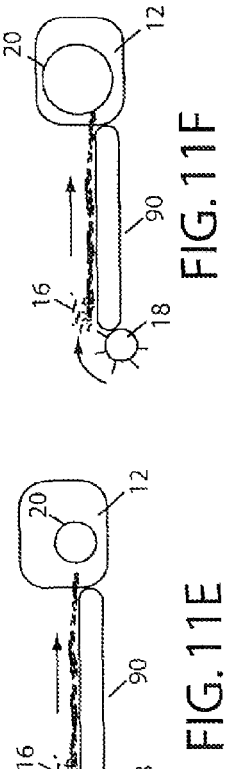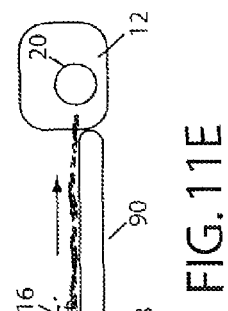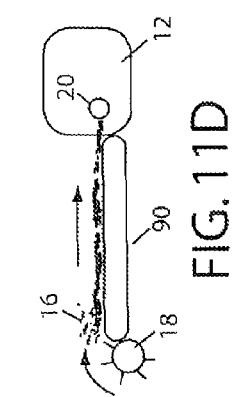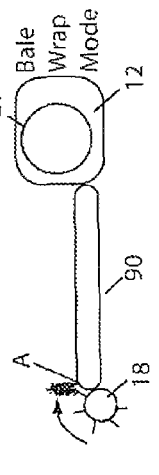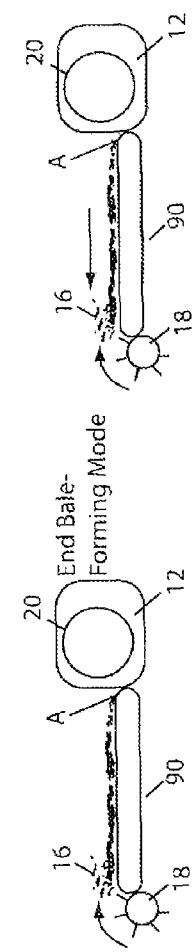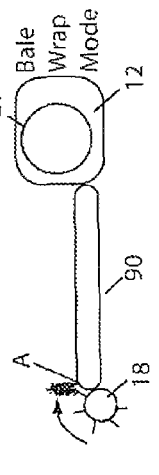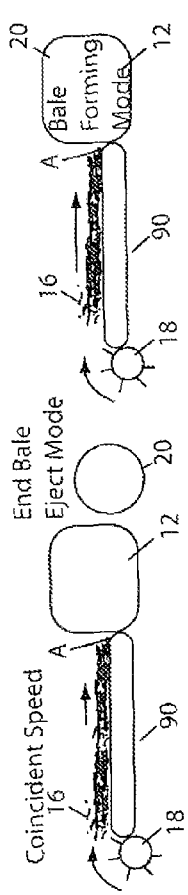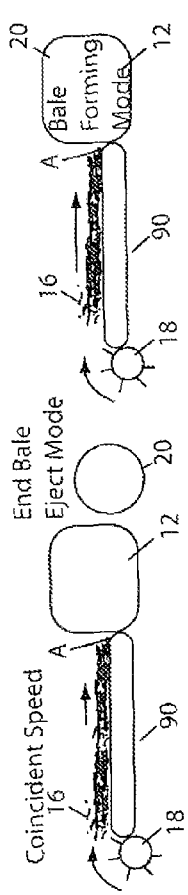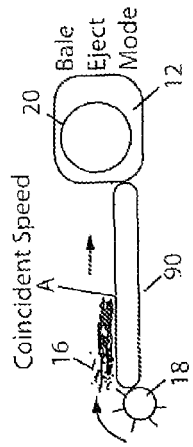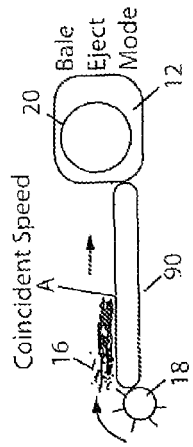

METHOD OF USING AN ACCUMULATION CONVEYOR WITH A CONTINUOUS ROUND BALER

CROSS REFERENCE TO RELATED APPLICATIONS

This application is a divisional of application Ser. No. 12/645,631 filed Dec. 23, 2009, now U.S. Pat. No. 8,413,414, which is hereby incorporated by reference in its entirety and claims priority under 35 U.S.C. 119(e) to U.S. Provisional Application No. 61/230,381 Jul. 31, 2009.

BACKGROUND

A conventional round baler is typically pulled through a field by a tractor where it gathers crop material, such as windrowed hay, and forms the crop material into a bale. The baler typically includes a pickup for gathering the crop material and providing it to an adjacent baling chamber where the crop material is formed into a bale.

The baler has three general operational cycles: a bale-forming cycle; a bale-wrapping cycle, and a bale-ejecting cycle. During the bale forming cycle, the baler is pulled through the field and the pickup provides crop material to the baling chamber. The baling chamber operates forming belts to form the received crop material into a bale. Once the bale is fully formed and the bale-forming cycle complete, the operator stops pulling the baler through the field, stops the pickup to cease providing crop material to the baling chamber, and begins the bale wrapping cycle. Typically the bale is wrapped using an automated mechanism while the tractor is idle. Once the wrapping cycle is complete, the bale-ejecting cycle begins in which the wrapped bale is ejected from the baler. After ejection of the wrapped bale, the operator once again starts pulling the baler through the field and restarts the pickup to again provide crop material to the baling chamber, and restarts the bale forming belts of the baling chamber during a new bale-forming cycle.

BRIEF DESCRIPTION OF THE DRAWINGS

FIGS. 11A-11L show the operation of a continuous round baler in accordance with an example embodiment.

DESCRIPTION OF EXAMPLE EMBODIMENTS

Overview

Figure 1:
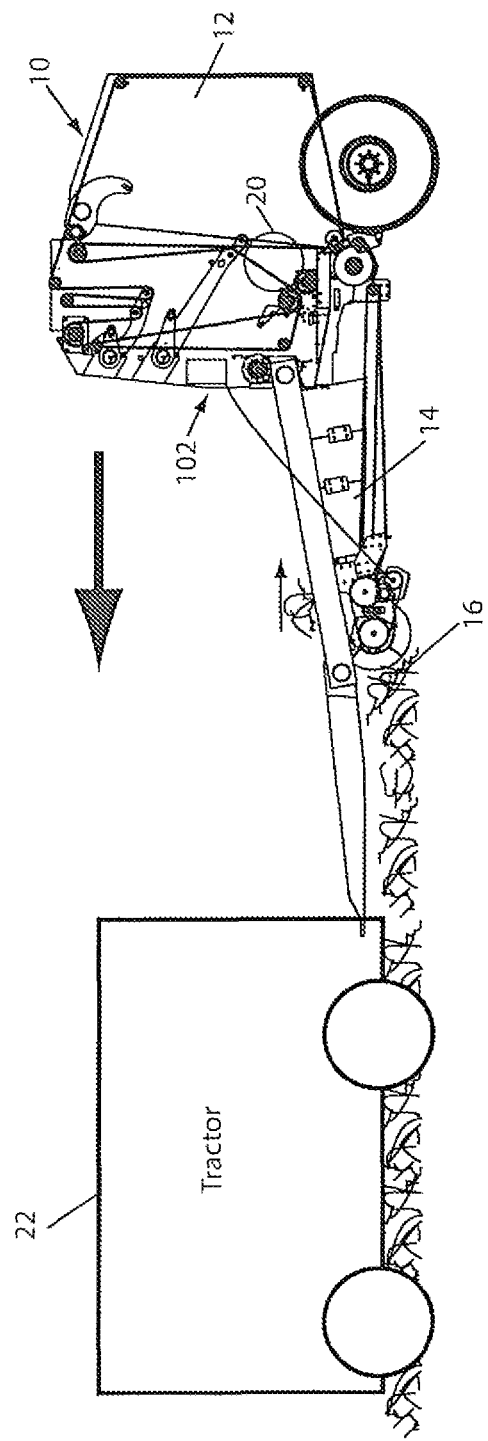
FIG. 1 shows a schematic of an example embodiment of a continuous round baler having a pickup conveyor being pulled by a tow vehicle.

In an example embodiment, a continuous round baler gathers crop material and bales the crop material into bales. The baler may be manipulated to continuously gather crop material and convey the crop material to the baler in accordance with a predetermined scheme. In one example embodiment, the crop material may be provided to a baling chamber of the baler during bale-forming operations and gathered and accumulated during non-bale-forming operations. This eliminates the stoppage of the baler's movement through the field and allows for the continuous collection of crop material without the stoppage associated with prior art balers. Although in the example embodiment the baler is shown gathering windrowed crop, such as hay, the term "crop material" is intended to include grain and material other than grain (MOG). For example, the continuous baler may be used for baling hay or biomass material such as corn cobs or the like.

In one example embodiment, a pickup conveyor is configured to gather crop material, accumulate the crop material, and convey the crop material to a baling chamber of the baler. The pickup conveyor may comprise a variable speed conveyor configured to receive crop and provide the crop material to a baling chamber, and a pickup header positioned adjacent the variable speed conveyor to gather crop material and provide the crop material to the variable speed conveyor. The speed of the pickup conveyor may be varied (i.e., stopped, started, sped up, slowed down and/or reversed) in accordance with a predetermined scheme, such as in accordance with the operational cycles of the baler. A controller may be provided for manipulating the speed of the variable speed conveyor in accordance with the predetermined scheme. For example, the controller may manipulate the conveyor to feed crop material to the baling chamber when the baler is in a bale-forming operation and to accumulate the crop material on the conveyor during non-bale-forming operations. A user interface may also be provided for receiving operating instructions from an operator of the continuous baler and for controlling certain functions of the baler and the pickup conveyor in accordance with the operating instructions.

In an example embodiment, the pickup conveyor may comprise a pickup header configure for mounting to a tongue, and the variable speed conveyor may comprise one or more conveyor belts rotatably coupled to a variable speed drive roll. A variable speed motor may be provided for powering the pickup and/or the conveyor. The motor may be controlled by the controller through various solenoid(s), flow control valve (s), and/or other means to vary the speed and direction of the motor and thus the speed and direction of movement of the pickup and/or conveyor belts and thereby manipulate the gathering of crop material and the conveyance of the crop material to a baling chamber of the baler.

The pickup device may be coupled to a tongue used to pull the baler so that the pickup can contact the ground to gather crop material and provide the crop material to the baling chamber of the baler. In an example embodiment, a forward or feed end of the conveyor may be positioned adjacent the pickup so that the crop material gathered by the pickup is provided to the conveyor.

A rear or outlet end of the conveyor may be positioned adjacent an inlet of the baler so that the crop material provided by the pickup to the conveyor may be fed into the baling chamber for baling when the conveyor is run in a feed direction. While the example embodiments are discussed in the context of a belt conveyor, one of skill in the art will recognize that other conveyor arrangements may be used, such as an auger conveyor or chain conveyor as known in the art, and the term "conveyor" is intended to incorporate these alternative arrangements.

This arrangement allows for the continuous gathering of crop material and continuous movement of the baler through the field. This arrangement also allows for the operation of the baler in accordance with a predetermined scheme, such as the feeding of the crop material to a baling chamber during a bale-forming operation of the baler, and accumulating the crop material during non-bale-forming operations of the baler.

One example method comprises: continuously gathering crop material; conveying the crop material in a feed direction to a baling chamber of a baler during a bale-forming operation of the baler; and conveying the crop material in a non-feed direction during a non-bale-forming operation of the baler. For example, a crop conveyor may be run in a feed direction during bale-forming operations and when the bale-forming operation is complete, the conveyor may be run in a reverse direction. In an example embodiment, the conveyor is run in reverse to reset the conveyor to an initialized condition and move crop material from the output end of the conveyor adjacent an inlet of the baling chamber to a receiving end of the conveyor adjacent the pickup. The example method may further include conveying the crop material in the feed direction during the non-bale forming operation of the baler. For example, once the conveyor is reset to an initial condition the conveyor may be run in a feed direction to move the crop material to the baling chamber.

In an example embodiment, the conveyor is run at a speed such that the crop material on the conveyor is accumulated on the conveyor but is not fed into the baling chamber during the non-bale-forming mode. In one example embodiment the conveyor is run at a speed such that crop material is placed adjacent the baling chamber as the baler reenters the bale-forming operation. In other words, the conveyor is run at a speed such that a point on the conveyor at the receiving or input end of the conveyor at the beginning of the non-bale forming operation is moved to the output end of the conveyor, i.e., the amount of time it takes a point on the conveyor to move across the length of the conveyor coincides with the amount of time it takes the baler to complete the non-bale forming operation, referred to as a coincident speed. This allows the crop material to be accumulated on the conveyor and positioned for entry into the baling chamber as soon as bale-forming operations are resumed.

Another example method comprises: continuously gathering crop material; providing the crop material to a variable speed conveyor; running the conveyor in a feed direction at a first speed during a bale forming operation of a baler to feed the crop material to a baling chamber of the baler; running the conveyor in a second direction during a non-bale forming operation of the baler; and running the conveyor in the feed direction to provide the crop material to the baling chamber. In the example embodiments, the non-bale forming operation may comprise a bale wrapping and/or a bale ejection operation, but could include other operations.

DETAILED DESCRIPTION

As required, example embodiments of the present invention are disclosed herein. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention.

Turning to the figures, FIG. 1 shows a schematic of a continuous baler 10 that comprises a baler 12 and a pickup conveyor 14. The pickup conveyor 14 gathers crop material 16 and provides the crop material 16 to the baler 12 (as shown by small arrow) for forming into a bale 20. A tractor 22, or other vehicle, may be used to pull the baler 12 through a field as indicated by the large arrow in FIG. 1.

Figure 2:
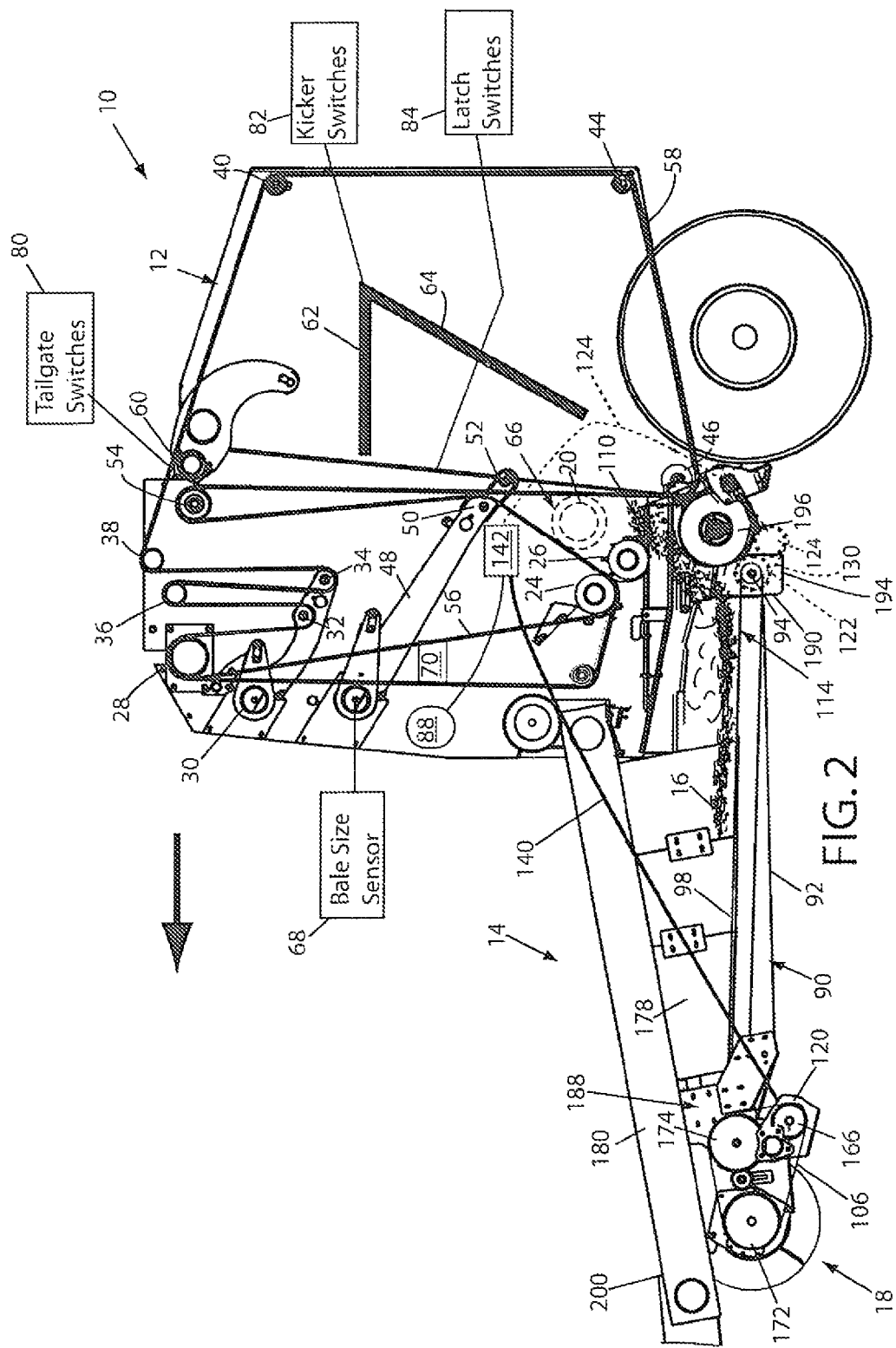
FIG. 2 shows a schematic of an example embodiment of a continuous round baler having a pickup conveyor.

As shown in FIG. 2, the pickup conveyor 14 may include both a pickup device 18 and a conveyor 90 and may be incorporated as part of the round baler 12. The baler 12 may be generally similar to traditional round balers such as that produced by Agco Corporation, such as the 5500 and 900 series round balers manufactured by Agco Corporation including the Hesston 5545, 5556, 5556A, and 5546 balers; however, the invention may be incorporated as a part of other types of baling equipment such as fixed chamber balers, etc. Other details of round balers which may be used with the present invention are described in U.S. Pat. Nos. 7,337,713; 6,675,561; and 6,477,824.

As seen in the example embodiment shown in FIG. 2, the round baler 12 may include a lower drive roll 24 and a starting roll 26. Above the lower drive roll is an upper drive roll 28. Pivotally mounted within the baler is a belt tension arm 30 to which are pivotally mounted the front belt tension roll 32 and the rear belt tension roll 34. At the top of the front portion of the bale chamber is a front upper idler roll 36 and a rear upper idler roll 38. Following the interior of the baler wall around clockwise, there is a tailgate belt roll 40 a lower rear tailgate roll 44, and front lower idler roll 46. A bale density arm 48 is pivotally mounted within the baler and has a front bale density roll 50 and a rear bale density roll 52, both pivotally mounted on the distal end from the pivotal mounting of the bale density arm 48. Near the top of the bale chamber above the bale density rolls is depicted an upper bale chamber roll 54. A plurality of bale forming belts 56 are threaded around each of the above identified rolls as depicted in FIG. 2. The bale forming belts are tensioned by the front and rear belt tension rolls 32, 34, mounted on the belt tension arm 30 and the rolls 50, 52 mounted on the bale density arm 48.

The example baler includes a tailgate 58 that opens and closes around a pivot point 60. A bale kicker assembly 62 (shown schematically) is associated with the tailgate. The bale kicker assembly 62 includes a bale push bar 64 (depicted in its home position) and two hydraulic cylinders (not shown). The bale kicker is used to prevent contact between the tailgate 58 and the bale when the tailgate 58 is closing. After the tailgate rises, hydraulic pressure is applied to the base end of the kicker hydraulic cylinders. The bale push bar 64 rises upward and rearward pushing the bale away from the tailgate before the tailgate closes. After the tailgate 58 is closed the kicker 62 is returned to its home position.

A baler control system may include a controller 70 positioned on or near the round baler 12 and a user interface 500 (FIG. 7) preferably positioned on the tractor 22 or other vehicle towing the baler 12. Although the controller 70 and the user interface 500 are preferably separate components, their functions could also be combined into a single unit positioned either on the baler 12 or its towing vehicle 22. The controller 70 may receive data from a variety of different sensors and in response issue commands to effectuate various operations of the baler 12 and/or the pickup conveyor 14. The controller 70 may be used to control the operation of the baler 12, including its various operational cycles, such as the bale forming, bale wrapping, and bale ejecting cycles, and the operation of the variable speed crop conveyor 14. For example, a bale size sensor 68 (shown schematically) may determine the size of the bale 20 in the baling chamber and provide a corresponding signal to the controller 70 and the user interface 500. For example, the bale size sensor 68 may be provided on the density arm 48 and detect the angular position of the bale density arm and send signals to the electronic control system to indicate the bale size during the bale forming cycle. The controller 70 may then determine the desired operational cycle for the baler 12 and the desired operation of the pickup conveyor 14.

The baler 12 can also include tailgate switches 80 (shown schematically) that detect the position of the tailgate 58 opened or closed, kicker switches 82 (shown schematically) that detect the position of the kicker 62 whether out or home, and latch switches 84 (shown schematically) that detect whether the tailgate 58 is latched. The tailgate 80 and kicker switches 82 may cause signals to be sent to the controller 70 indicating the status of the elements to which they are connected.

In addition to the elements described above, the baler 12 can include a variable speed drive system (FIG. 1) that may include a hydraulic pump 88 and various hydraulic components. The baler may also include a clutch assembly and various control electronics, neither of which is shown in FIG. 2 but which are necessary for operation of the baler as will be understood by one of ordinary skill in the art. A clutch assembly is disclosed in U.S. Pat. No. 6,272,825 which is hereby incorporated by reference herein.

Figure 3:
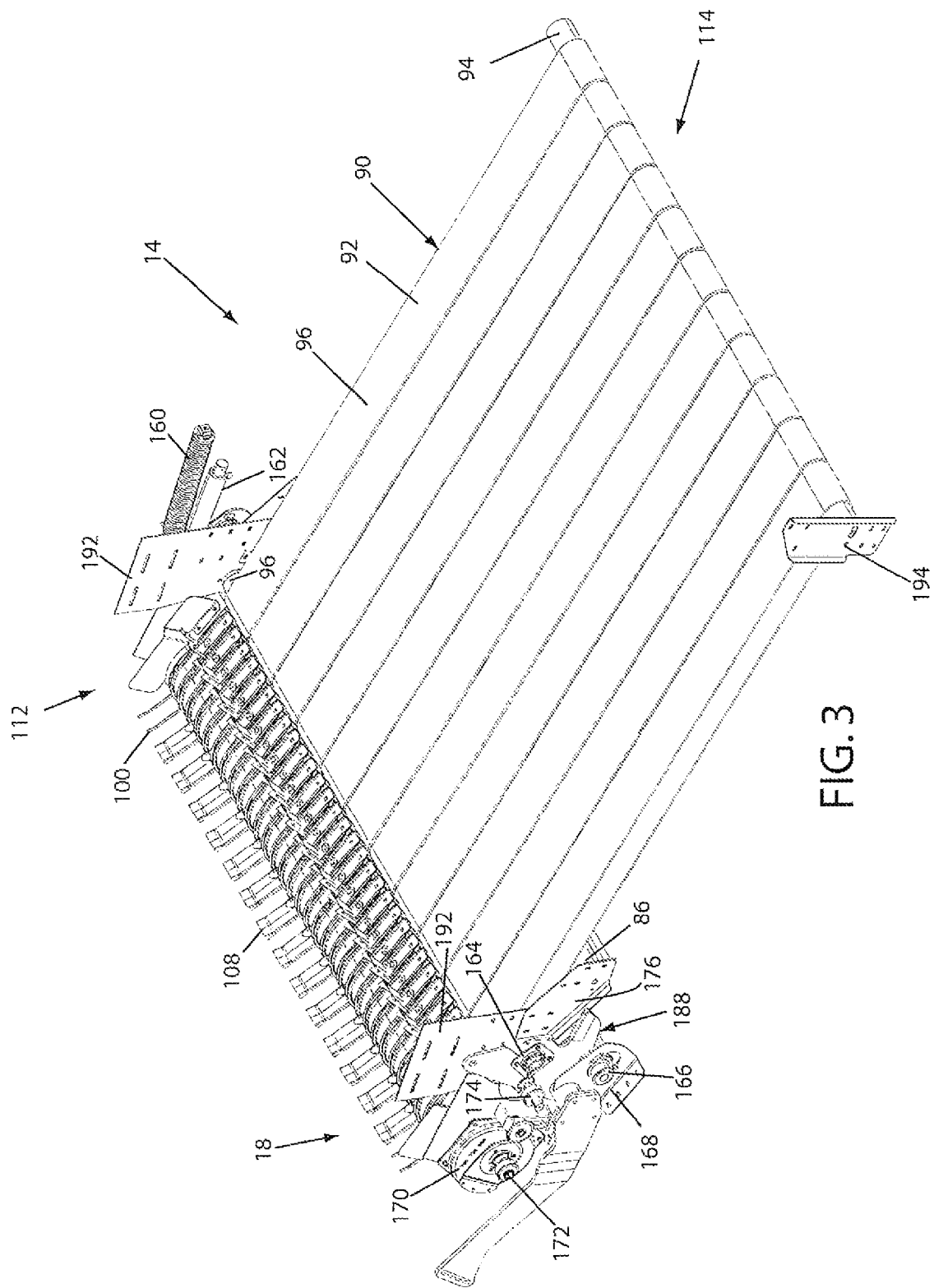
FIG. 3 shows a perspective view of an example embodiment of a pickup conveyor arrangement.

In the example embodiment shown in FIG. 3, the conveyor 90 comprises a plurality of endless belts 92 that are wrapped around rolls 94, 96 for movement. The top surface 98 of the conveyor belts 92 define a movable accumulating and conveying surface for receiving crop material 16 from the pickup 18 and conveying the crop material 16 to an inlet 110 of a baling chamber 66 of the baler 12. The conveyor belts 92 may be arranged to extend from a forward or receiving end 112 located adjacent the pickup 18 to a rear or output end 114 adjacent the inlet 110 of the baler 12. The conveyor belts 92 may comprise a plurality of parallel spaced endless belts wrapped around the rolls 94, 96. Other arrangements could be used such as a single belt of greater width. In the example embodiments, the belts 92 may be staggered such that every other belt engages a lower idler roll 86. This arrangement creates gaps between the portions of the belts extending below the rolls 94, 96 to allow crop material 16 that falls into the gap between the conveyor belts 92 to pass to the ground.

The pickup 18 may be similar to pickups previously provided adjacent an inlet of a baler such as the pickup is shown in U.S. Pat. Nos. 7,337,713; 6,675,561; and 6,477,824. Similar pickups have been provided on round balers manufactured by Agco corporation for several years. The pickup 18 may be provided at the forward or receiving end 112 of the conveyor 90 so that crop material 16 gathered by the pickup 18 is provided to the conveying surface 96 of the conveyor 90.

Figure 4:
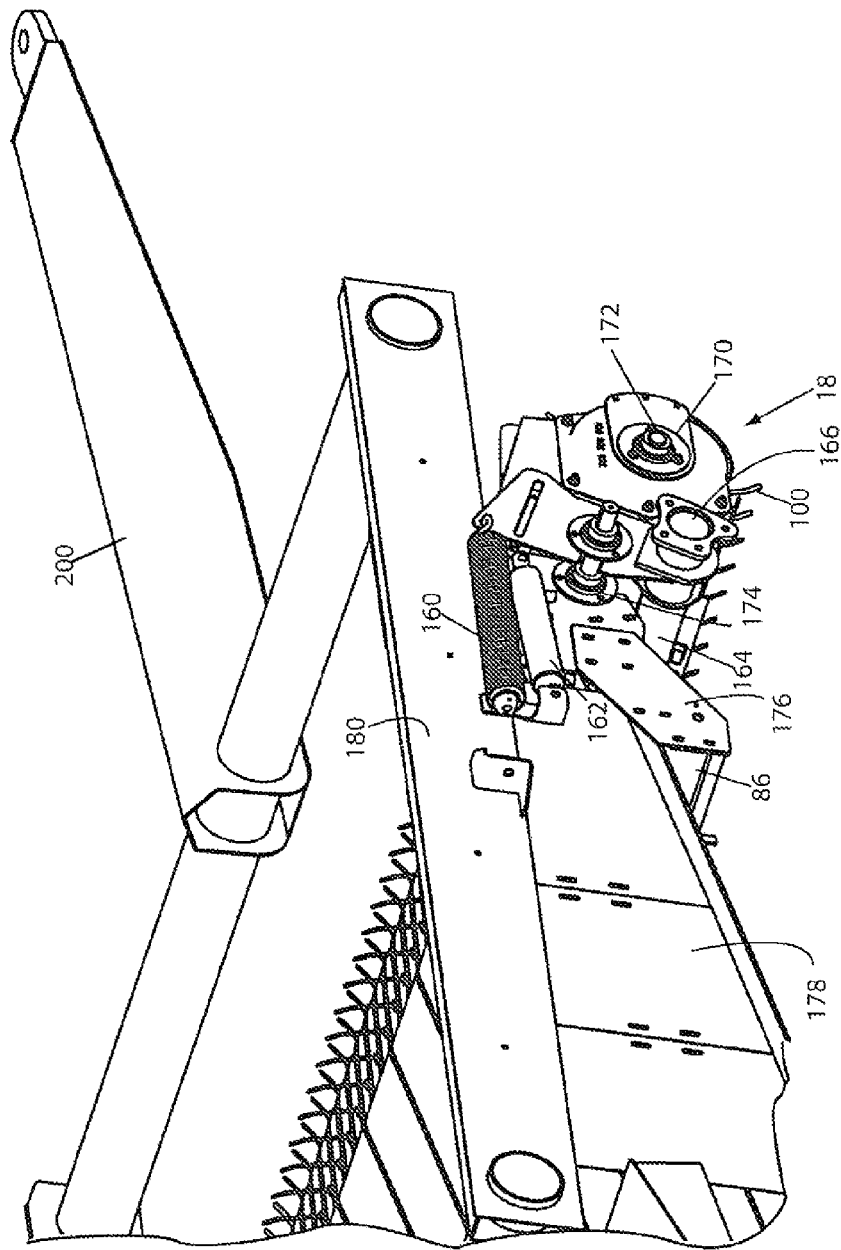
FIG. 4 shows a perspective view of an example embodiment of a crop gathering end of a pickup conveyor arrangement.
Figure 5:
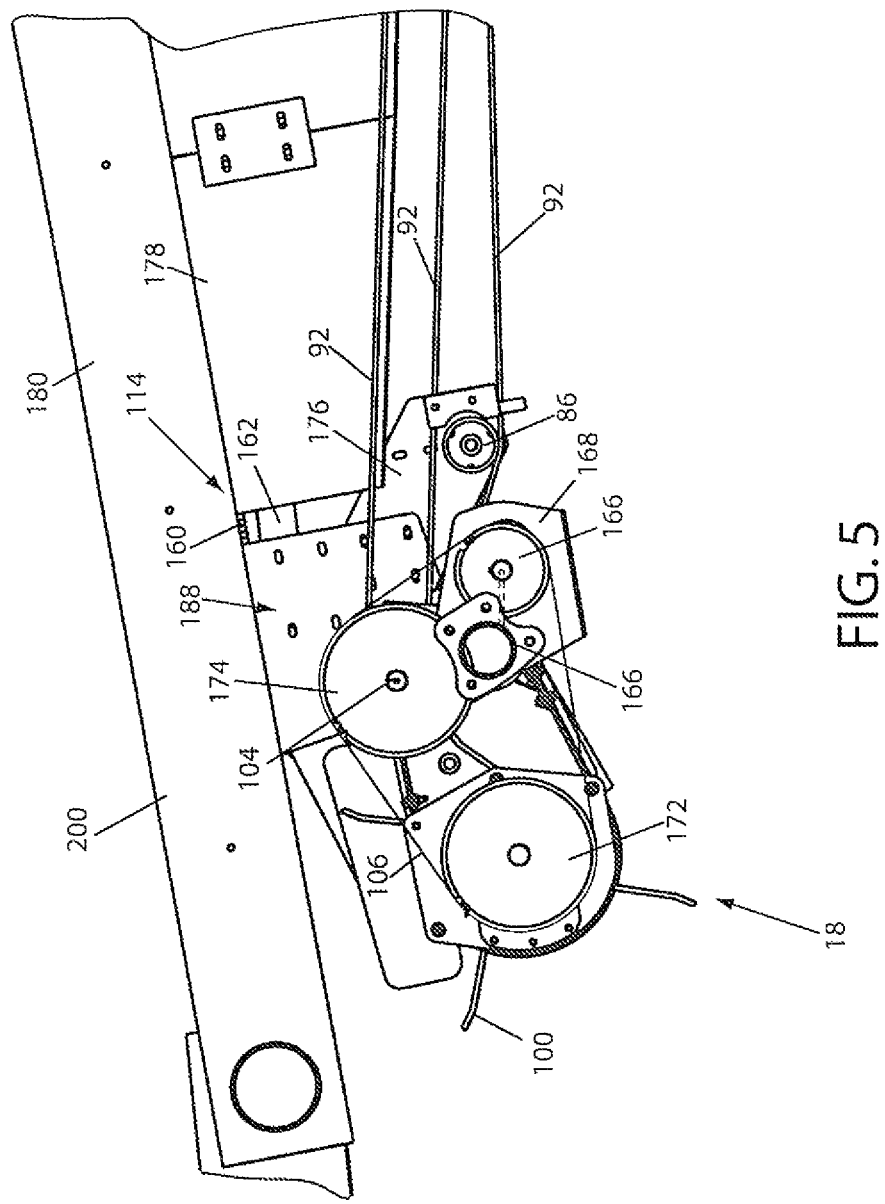
FIG. 5 shows a side view of an example embodiment of a crop gathering end of a pickup conveyor arrangement.

In the example embodiment shown in FIGS. 3-5, the pickup 18 is in the form of a retracting finger pickup reel that has a plurality of radial tines 100 attached to a drive roll so as to rotate about an axis to pick up crop material 16 off the ground and throw the crop material 16 rearwardly onto the conveyor belts 92 for transport by the conveyor 90. In the example embodiment shown in FIG. 3, inner tines 108 may also be provided. The tines 100, 108 may have different diameters and different spring rates as desired. For example, the outer tines 100 may be made of larger diameter and have a stiffer spring rate than the inner tines 108. The pickup 18 may be mounted to a tongue 200 so that it is provided a short distance above the ground, so that as the pickup 18 is moved through a field it lifts the crop material 16 previously cropped and windrowed above the ground and directs it toward the conveyor 90. A pickup drive roll (not shown) may be journaled on a mounting plate 192 such as by a bearing assembly 170. The pickup 18 may be pivotally mounted to the tongue 200 to allow adjustment of the pickup 18. For example, the pickup 18 may be mounted on a support member 164 and movable about the support member 164 by a spring 160 and a hydraulic cylinder 162 that are coupled to the tongue 200 and the mounting plate 192 (FIG. 4). In FIG. 3 the pickup 18 is shown in a first orientation and in FIG. 4 the pickup 18 is shown pivoted to a different orientation as the hydraulic cylinder 162 may be expanded or contracted by the hydraulic pump 88.

To couple the pickup conveyor 14 to the baler 12, front mount assemblies 188 and rear mount assemblies 190 may be provided. The mount assemblies may include mounting plates 192, 194 that couple the conveyor 90 and pickup 18 to the tongue 200 and the baler 12 and rotatably support the pickup drive roll 104 and the conveyor rolls 94, 96, 86. One of skill in the art will recognize that other conveyor arrangements may be employed such as an auger conveyor or a chain conveyor as known in the art. Wind guards 178 may be provided that extend between a tongue support member 180 down toward the conveyor belts to assist in prevention crop material 16 from falling off the lateral sides of the conveyor 90 and protecting the crop material 16 from cross winds.

The conveyor 90 and the pickup 18 may be driven by the drive system 102 that may include a motor 120 having a motor drive wheel 166. For example, as best shown in FIG. 5 a hydraulic motor 120 may be mounted on a motor mounting plate 168 and arranged to rotate a pickup drive wheel 172 which in turn rotates the pickup drive roll 104. The hydraulic motor 120 may also be arranged to drive a conveyor drive wheel 174 associated with the conveyor drive roll 96. For example, a drive belt or chain 106 may be looped around the motor drive wheel 166, the pickup drive wheel 172 and the conveyor drive wheel 174 so that when the motor drive wheel 166 is rotated the pickup drive wheel 172 and conveyor drive wheel 174 also rotate and in turn drive rotate the pickup roll 104 and the conveyor drive roll 96 via a drive belt 106. Thus, the tines 100 of the pickup 18 and the conveyor belts 92 may be driven by the variable drive system 102 and the speed of same varied by manipulating the motor 120. For example, fluid may be provided to the hydraulic motor 120 by a hydraulic pump 88 and manipulated by solenoids and/or flow control valves to vary the fluid flow to vary the speed of the motor 120 and the movement of the pickup tine 100 and conveyor belts 192.

This arrangement allows the movement of the conveyor belts 92 to be controlled by the controller 70. Although shown in the example embodiment as a single drive belt 106 that powers both the pickup 18 and the conveyor 90 other arrangements may be provided such that pickup 18 and the conveyor 90 may be driven independently. For example, separate motors may be used to power the pickup 18 and the conveyor 90 and the motor drive wheel 168 would only loop around the pickup drive wheel 172. In that case, a separate conveyor drive wheel 122 may be provided at the rear roller 94 with a second hydraulic motor 124 dedicated to driving the rear roller 94 with a belt 130 as discussed in related U.S. Pat. No. 8,291,687 entitled "Continuous Round Baler" and as shown in dashed lines in FIG. 2. The conveyor drive wheel 122 could be driven similar to that of the motor drive wheel 168 and actuated in a similar manner by the controller 70. In this arrangement the pickup 18 and the conveyor 14 could be driven at different speeds and directions as desired. For example, the pickup could continue to provide crop material 16 to the conveyor 14 when the conveyor 14 is run in a forward or reverse direction and at various speeds. In the example embodiment of FIG. 2, the drive system 102 may include a hydraulic pump 88 mounted in the baler 12 and powered by a takeoff mechanism of the vehicle 22. Hydraulic lines 140 may extend to a manifold 142 mounted in the baler 12 and be coupled to solenoids and/or flow control valves that respond to command signals sent from the controller 70 to manipulate hydraulic fluid provided to the motor 120. In an example embodiment, an "on" solenoid valve 150, an "off" solenoid valve 152, and a flow control valve 154 (all shown schematically in FIG. 7) may be communicatively coupled to the controller 70 and used to control the hydraulic motor 120 and thus the movement of the conveyor belts 92. Hydraulic lines may also be coupled to other components that may be controlled by the controller 70. For example, the controller 70 may control the opening of the closing of the tale gate 58 by manipulating tailgate hydraulic cylinders (not shown) and the positioning of the pickup 18 by manipulating associated hydraulic cylinders 162. It should be noted that while a single controller 70 is shown as controlling both the pickup conveyor 14 and the baler's operational cycles, multiple controllers could be used to accomplish the same tasks.

As discussed in more detail below, the pickup conveyor 14 may be manipulated by the controller 70 in accordance with predetermined schemes input by an operator. For example, the conveyor 90 and/or pickup 18 may be driven at different speeds in conjunction with the different operation cycles of the baler 12. For example, the conveyor belts 92 may be driven at a first speed during a bale forming cycle of the baler 12 and a second speed during non-bale-forming operations (such as wrapping and ejection operations) to allow crop material 16 to accumulate on the conveyor belts 92. This allows for the continuous movement of the baler 12 through the field as crop material 16 and the continuous gathering of crop material 16 by the pickup 18. The crop material 16 may be accumulated on the conveyor 90. The accumulated crop material 16 can then be fed into the baler 12 during an appropriate operational cycle, such as a bale forming cycle.

Various sensors in the baler 12 can be used by the controller 70 to control the operating cycles of the baler 12 and the pickup conveyor 14. For example, the bale size sensor 68 can be used to determine when to end a bale forming cycle and begin a non-bale forming cycle by sending a signal that the bale is of a suitable size. For example, if the bale size sensor 68 sends a signal that the bale 20 is less than a minimum size, then the controller 70 may run the conveyor belts 92 at a first speed. If the bale size sensor 68 indicates that the bale 20 is of a sufficient size then the controller 70 may instruct the baler to enter into non-bale forming operations, such as bale wrapping, and run the conveyor in reverse at a second speed, such as reverse. When other sensors, such as the tailgate switch 80, indicate that the bale 20 has been ejected from the baler 12, then the controller 70 may begin a new bale forming cycle and run the conveyor 90 at a desired speed.

Figure 6:
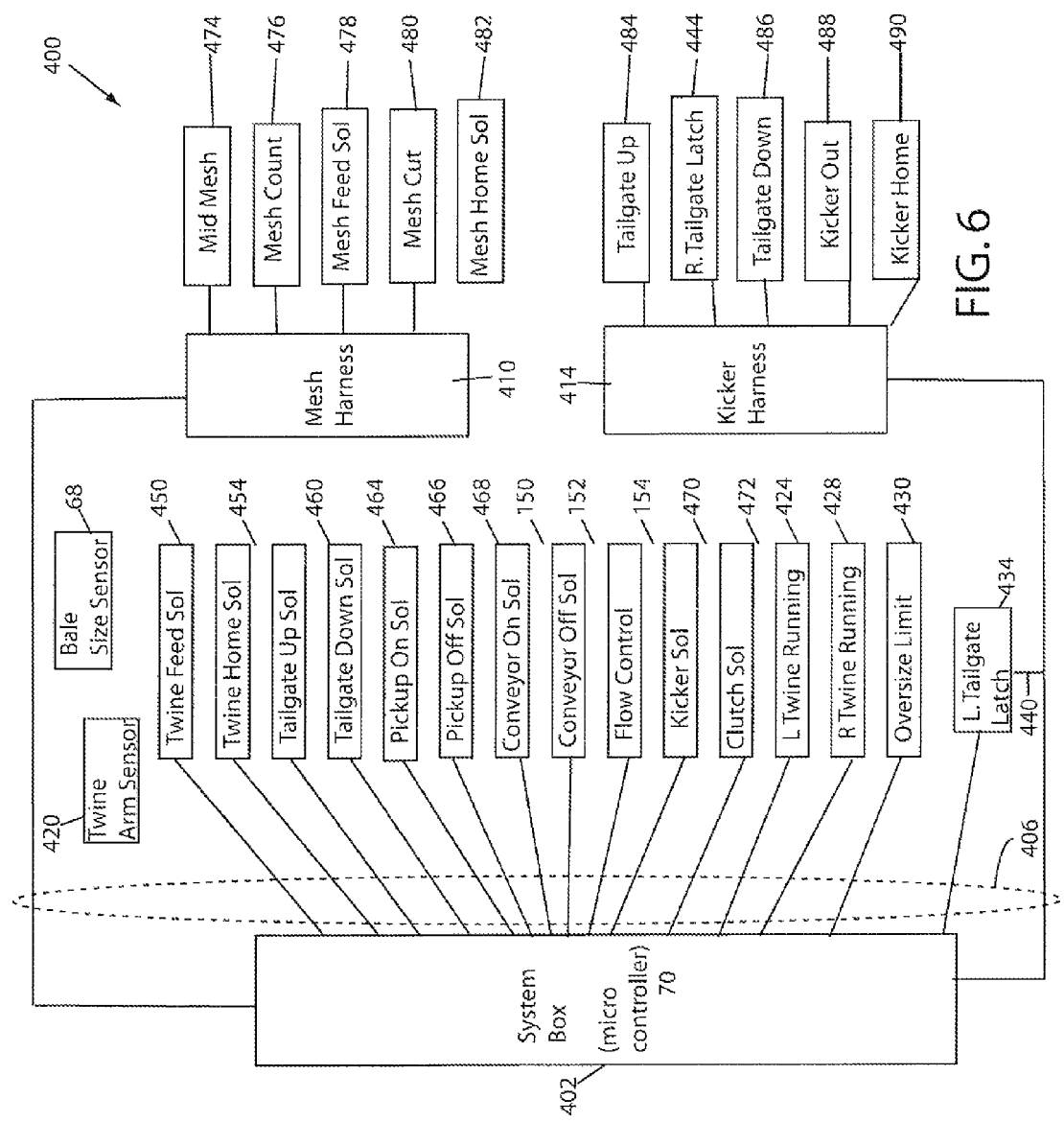
FIG. 6 shows a schematic drawing of an example embodiment of an electronic control system of the continuous baler of FIG. 2.

FIG. 6 shows a schematic drawing of an embodiment of an electronic control system 400 of the continuous round baler 12 of FIG. 2. The system 400 of FIG. 6 comprises a system box 402 containing a controller 70 and associated electronic components whose construct will be understood by one of ordinary skill but the details of which are unimportant to the present invention. The arrangement may be comprised of hardware, software, firmware or combination thereof as would be apparent to one of skill in the art. For example, the controller 70 may be a microcontroller capable of receiving data and issue commands for the control of various systems and components in accordance with particular schemes that may be programmed in the microcontroller.

Schematically depicted are three harnesses that connect the system box 402 and controller 70 to elements controlled by the controller that are distributed about the round baler 12 and the conveyor 90. There is a main harness 406, a mesh harness 410, and a kicker harness 414. Although single lines are depicted running from the system box to the various elements, these lines are meant to represent multiple wired connections that run through the harnesses and are connected to the indicated elements.

The main harness 406 connects the system box 402 and controller 70 to different sensors and switches including a twine arm sensor 420, a bale size sensor 68, a left twine running switch 424, a right twine running switch 428, an oversize limit switch 430 and a left tailgate latch switch 434. The bale size sensor 68 sends signals to controller 70 to indicate the size of the bale during the formation cycle. The twine arm sensor 420 sends signals to controller 70 to indicate the location of the twine arm if a twine wrap is being used. Likewise, the left and right twine running switches 424, 428 indicate to the controller when the left and right twine rolls are turning and therefore dispensing twine. The oversize limit switch 430 indicates to the controller 70 when the bale has exceeded the trip point for a maximum bale size in the chamber. The left tailgate latch switch 434 indicates whether the left tailgate latch is open or closed. A line 440 is meant to schematically indicate that left tailgate latch switch 434 is actually connected in series with right tailgate latch switch 444 (described below).

The main harness 406 also connects system box 402 and the controller 70 to different solenoids and valves that activate the flow of hydraulic fluid to different systems of the baler 12 and the conveyor 90. These may include the twine feed solenoid 450, the twine home solenoid 454, the tailgate up solenoid 460, the tailgate down solenoid 464, the pickup up solenoid 466, the pickup down solenoid 468, the conveyor on solenoid 150, the conveyor off solenoid 152, a flow control valve 154, the kicker solenoid 470, the clutch solenoid 472 and an auxiliary solenoid (not shown). The twine feed solenoid 450 actuates the twine wrapping mechanism. The twine home solenoid 454 causes the twine arm to return to its home position. The tailgate up solenoid 460 actuates a hydraulic cylinder that lifts the tailgate 58. Tailgate down solenoid 464 causes the same hydraulic cylinder to close the tailgate 58. The pickup up solenoid 466 actuates the hydraulic cylinder 162 (FIG. 4) to lift the pickup 18 into an up position and the pickup down solenoid 468 actuates the same hydraulic cylinder to move the pickup into a down position. The kicker solenoid 470 actuates hydraulic cylinders to move the kicker out and back. The clutch solenoid 472 engages and disengages the main drive clutch to establish and suspend the driving connection between the power takeoff shaft of the tractor 22 and various components of the baler 12, such as the stub augers, the starter roll, and the belt drive rolls of the baler. The conveyor on solenoid 150 actuates movement of the conveyor belts 92 of the conveyor 90, the conveyor off solenoid 152 causes the conveyor belts 92 to stop, and the flow control valve 154 regulates the speed of the conveyor belts 92 by controlling the flow of hydraulic fluid to the motor 460. The auxiliary solenoid is available to run optional equipment. Likewise, depending on the arrangement of the motor 120 and the pickup drive roll 104, the rotation of the tines 100 of the pickup 18 may be varied. Other alternate embodiments will become apparent to one of skill in the art. For example, in one alternate embodiment, a hydrostatic drive comprising a pump on the towing vehicle and a motor on the baler may be used in lieu of the mechanical power takeoff shaft of the tractor 22. In another alternate embodiment, an engine may be mounted on the baler to form a self-powered baler. A clutch may then be used to disconnect the engine from the baler drives.

The mesh harness 410 connects the system box 402 and controller 70 to the mid-mesh switch 474, the mesh count switch 476, the mesh feed solenoid 478, the mesh cut switch 480, and the mesh home solenoid 482. The mesh wrapping mechanism is optional and so may or may not appear on any given unit. The mid-mesh switch 474 provides position feedback to controller 70 to stop the mesh dispensing roller in the correct wrapping location. The mesh count switch 476 allows the controller 70 to estimate the amount of mesh usage and indicate the mesh is being applied. The mesh feed solenoid 478 causes the mesh to be fed to the bale chamber during the wrapping cycle. The mesh home solenoid 482 actuates a hydraulic cylinder that returns the mesh wrapping mechanism to its home position at which point a mechanical break over will cut the mesh and close mesh cut switch 480 signaling the end of the meshwrapping process to the controller 70.

Kicker harness 414 connects the system box 402 and controller 70 to different switches including tailgate up switch 484, right tailgate latch switch 444, tailgate down switch 486, kicker out switch 488, and kicker home switch 490. Tailgate up switch 484 signals the controller when the tailgate 58 is in the up position. The right tailgate latch switch 444, wired in series with left tailgate latch switch 434, signals the controller 70 when the tailgate 58 is latched. Because of the series connection between these two switches, no signal is sent unless both are closed. Tailgate down switch 486 signals the controller 70 when the tailgate 58 is in its down position and that the kicker solenoid 470 should deenergize. Kicker out switch 488 signals the controller when the kicker is in its out position and that the tailgate down solenoid 464 should energize. Kicker home switch 490 signals the controller 70 when the kicker is in its home position.

Figure 7:
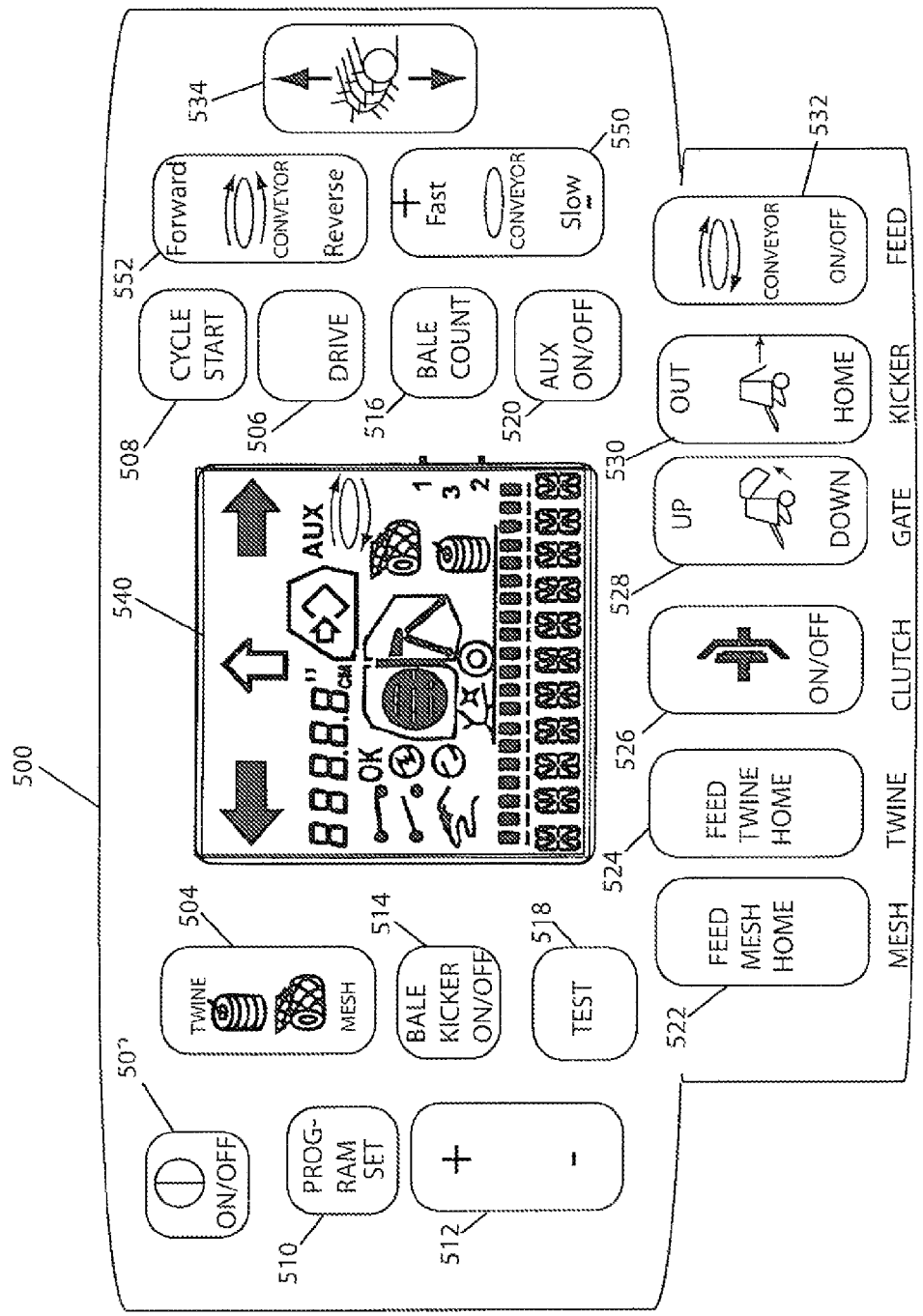
FIG. 7 shows a schematic view of an example embodiment of a control console at a vehicle that is accessible by an operator when towing the round baler of FIG. 2.

FIG. 7 shows a user interface 500 in the form of a control console 500 provided at an operator's station, such as in the cab of the towing vehicle, such as that of a tractor 22 pulling the baler 12 through the field and providing crop material 16 to the baler 12, that is accessible by an operator when operating the round baler 12. The control console 500 may be configured with controls to provide the operator with different levels of control over the baler 12 and pickup conveyor 14. For example, the operator may be provided with full manual control mode of the round baler, semi-automatic control mode, or automatic control mode. In full manual control mode the operator initiates each major step in the baling process. In the semi-automatic mode, the operator will have less interaction and control fewer tasks. In the full automatic control mode the baler 12 and the pickup conveyor 14 may operate continuously without additional input from the operator.

The example embodiment of the control console 500 of FIG. 5 includes a power on/off button 502, a twine/mesh select button 504, a drive control button 506, a cycle start button 508, a program set button 510, a value control button 512, a kicker on/off button 514, field/total bale count button 516, test button 518, auxiliary output on/off button 520 and pickup lift button 534. In addition, there are a variety of control buttons including mesh 522, twine 524, clutch 526, gate 528, kicker 540 and conveyor 532. There is also a central display 540 that indicates baler and conveyor status to the operator during the various baler operational cycles and conveyor modes of operation. In addition to the control console 500, a remote control (not shown) may also be used to handle some control functions including the cycle start function described below.

The controller 70 can have a variety of modes of operation: (1) neutral; (2) test; (3) program; (4) drive; (5) semi-auto; (6) manual, and (7) auto/continuous. The system starts in the neutral mode. At system start up certain checks are performed by the system and the baler and conveyor status is displayed to the operator. From the neutral mode the operator can press the test, set, drive, or any of the mode keys.

The test mode is entered when the operator pushes test key 518. The test mode is used to check the condition of the electrical system components of the baler. This status will be displayed on the console screen 540.

Program mode is entered by depressing set key 510. The operator uses the program mode to set the various settings for controlling baler and conveyor functions. The program mode symbol will illuminate. The setting name and the value will appear on the display screen. To change a value or setting option, the operator can press the appropriate side of value key 512. The set button can be pressed again to advance to the next setting name. Among other values and settings, the baler can be set in automatic mode, also referred to as continuous mode, during the program mode and a bale size conveyor scheme selected.

There are two semi-automatic modes: auto kick and auto wrap. In auto kick mode the baler 12 will form a bale and await a signal prior to wrapping the bale. Once wrapping is signaled, the bale is wrapped and immediately ejected without operator intervention. In auto wrap mode the bale is wrapped automatically after the predetermined bale size is attained and the baler awaits an operator signal before ejecting the wrapped bale. In the automatic or continuous mode, the bale forming, auto kick and auto wrap modes, as well as the movement of the conveyor, may be performed without direct operator intervention. In the continuous mode, the baler 12 may be pulled through the field without stopping and crop material may be continuously provided to the conveyor.

The drive mode is entered by depressing drive key 506. When the drive mode is entered the clutch is engaged and the forming belts 56 of the baler 12 begin to turn and the conveyor motor 120 is powered and the conveyor belts 92 of the conveyor 90 and the tines 100 of the pickup 18 begin to turn. The operator may drive the tractor 22 or other tow vehicle forward pulling the baler 12 behind it with the pickup 18 down to gather crop material and provide the crop material 16 to the conveyor belts 92. The operation of the various modes of the baler 12 may be similar to the disclosed in U.S. Pat. No. 6,675,561 entitled "Round Baler Semi-Automatically Sequenced Operating Cycles and Selectively Variable Point of Operator Intervention", which is incorporated by reference herein, and include the bale forming, bale wrapping, and bale ejection modes which may operated semi-automatically with some operator intervention or fully automatically without operator intervention. In either case, the operation of the conveyor 90 may be operated automatically in response to the various modes of the baler 12. For example, the conveyor may be programmed to move in response to the different operational modes of the baler 12, whether the modes of the baler 12 are performed automatically, semi-automatically, or manually. The drive mode key 506 may be depressed whether manual mode, semi-automatic mode, or automatic (continuous) mode will be employed to control the baler operational cycles. In semi-automatic mode, as the baler 12 completes all of the cycles for creating and ejecting a bale 20 it will automatically return to the drive mode for subsequent cycles as further described below. In the automatic (continuous) mode the baler 12 and the conveyor 90 may continuously switch between the various modes until instructed otherwise and so that the baler 12 can be continuously pulled through the field and continuously fed crop material.

The semi-automatic baler mode may be entered by first selecting one of the two modes, auto kick or auto wrap, during the program mode and then depressing the drive key 506 as previously described. The automatic or continuous mode can be entered by selecting the continuous mode during the program mode and then depressing the drive key 506 as previously described. The manual mode can be entered at any time by pressing one of the manual keys. Once in manual mode, the operator controls the forming cycle by controlling the clutch with the clutch button 526, the wrapping cycle by depressing either the mesh button 522 or twine button 524, the ejecting cycle by controlling the tailgate with the gate button 528 and the kicker with the kicker button 530, and the pickup conveyor be pressing the conveyor button 532. The pickup button 534 may be used to raise and lower the pickup 18. In addition to the conveyor on/off button, a conveyor speed button 550 and conveyor direction button 552 may be provided to manually control the speed and direction of the conveyor 90 in when the system is operating in the manual and/or semi-automatic modes. These buttons 550, 552 would send signals to the controller 70 for manipulating the flow control valve 154 and the drive roll 94.

The baler 12 and conveyor 90 may operate as follows. The variable displacement pump 88 within the baler receives energy from the power take-off of the vehicle 22 and pressurizes the system. When the operator signals the beginning of the bale formation cycle by depressing drive key 506, the electronic controller 70 sends a signal to the clutch solenoid 472 which engages the clutch causing the starter roll 26 and the forming belts 56 to turn. For example, the controller 70 may sends a signal to the conveyor on solenoid 150 and flow control valve 154 to power the motor 120 to operate the motor drive wheel 166 to turn the conveyor roll 94 and the pickup roll 104 to move the conveyor belts 92 and pickup tines 100 at a desired speed.

The operator may move the baler 12 through the field by towing the baler 12 behind a tractor 22 and use the pickup 18 to gather crop material 16 and provide it to the conveyor belts 92. The conveyor belts 92 convey the received crop material to an inlet 110 of the baling chamber 66 of the baler 12 when the belts 92 are run in a feed direction. An intermediate feeder 196 may be provided to assist in feeding the crop material 16 into a baling chamber 66 and may include an auger to move crop material laterally inward toward the inlet. Once in the baling chamber 66, the crop material 16 contacts the rough top surface of forming belts 56 which are moving upward. The forming belts carry the crop material 16 to the top of the starting chamber which is formed by the front and rear bale density rolls 50, 52. The motion of the forming belts turns the crop material downward against starting roll 26. The core is started and begins to roll. Hydraulic cylinders pull down on the bale density arm 48 and belt tension 30 arms. The bale density rolls 50, 52 are held down to reduce the size of the bale chamber to a starting size. The belt tension rolls 32, 34 are held down to supply tension to the forming belts. As the bale increases in size, the bale density rolls 50, 52 and the belt tension rolls 32, 34 are forced up. The bale density rolls 50, 52 put an increasing amount of downward force against the bale. This force keeps tension on the bale and compresses the crop material coming into the bale chamber. The belt tension rolls move upward to give more forming belt for the increased size of the bale within the chamber.

As the bale size increases and bale density arm 48 moves upward, the bale size sensor 68 continually sends signals to controller 70 indicating bale size. The controller 70 will detect when the bale has reached or exceeded a desired bale size, which may have been originally programmed during the program mode by the operator. The bale size may also be indicated on the console screen 500. If the baler 12 is operating in continuous mode, then when the bale size has reached or exceeded the predetermined bale size, the baler 12 enters the wrapping cycle or other non-bale-forming mode. The conveyor 90 may be manipulated in accordance with the new operational mode. For example, the conveyor 90 may be sped up, slowed, stopped, and/or reversed during the wrapping cycle as the baler 12 continues through the field and crop material continues to be provided to the conveyor 90 by the pickup 18 so that crop material 16 accumulates on the conveyor 90. In one example embodiment, the conveyor 90 is reversed so that the crop material located at the output end 114 of the conveyor is placed at the receiving end. The conveyor may then be run in a feed direction during the non-bale-forming cycle. In an example embodiment, the conveyor 90 is run at a speed such that the crop material placed at the receiving end when the conveyor is reversed is placed at the inlet 196 of the baling chamber 66 when the baler begins a new bale-forming cycle. This allows crop material to be accumulated on the conveyor 90 during the non-bale-forming operations and placed in position for feeding when the bale-forming operations resume.

In the wrapping cycle the controller 70 may activate either mesh feed solenoid 478 or twine feed solenoid 450 to wrap the bale, depending on the wrap method selected during the program mode. The twine wrap mechanism or mesh wrap mechanism performs its function as will be readily understood by one of ordinary skill in the art. Once the wrap cycle is complete, the clutch solenoid 472 is deactivated by controller 70 to disengage the clutch and stop motion of the forming belts 56. The controller then proceeds to the ejecting cycle. As discussed above, the conveyor may be reversed and then run at a specified feed rate during the non-bale forming operations as the pickup 18 continues to gather crop material 16 provide it to the conveyor 90.

In the ejecting cycle, the controller 70 causes the tailgate 58 to lift by actuating the tailgate up solenoid 460. Once tailgate up switch 484 closes, signaling the position of the tailgate to controller 70, the controller 70 activates the kicker solenoid 470 causing the kicker to push the bale away from the baler. The kicker proceeds outward until in its fully extended or out position, closing kicker out switch 488. The controller then activates the tailgate down solenoid 464 causing the tailgate 58 to move to the down position and closing tailgate down switch 486 which in turn indicates the down position to controller 70. The controller 70 then causes kicker solenoid 470 to deactivate. The tailgate latch switches 434, 444 close, causing the clutch solenoid 472 to energize and forming belts 56 to turn. Deactivation of the kicker solenoid 470 causes the kicker to return home, closing the kicker home switch 490. The baler 12 then immediately begins a new forming cycle as discussed above and the controller 70 begins to feed the crop material 16 into the baling chamber.

If the operator selects the autowrap semi-automatic mode, the baler will form the bale as described above and, after a short delay, proceed directly to the wrap cycle to wrap the bale without operator intervention. The baler will then await operator intervention comprised of pressing cycle start key 508 or the remote cycle start switch before beginning the ejecting cycle. After receiving operator input, the baler 12 will raise the tailgate 58, unload the bale from the chamber, send the kicker out, lower the tailgate, and send the kicker home, all as previously described. When the tailgate latches 434, 444 are closed, the drive forward arrow may illuminate on display 540. The conveyor 90 can automatically adapt its speed in response to the different modes of the baler 12. Likewise, in a fully automatic (continuous) mode, the baler 12 can move through the various bale forming, wrapping, and ejecting cycles without operator intervention and the conveyor's movement automatically changed in accordance with the different operational cycles of the baler 12. If operating in a non-continuous mode, such as the manual or semi-automatic modes, then the operator can control pickup conveyor 14 by use of the conveyor on/off button 532 the conveyor speed button 550, the conveyor direction button 552, and the pickup button 534 on the control console 500.

Figure 8:
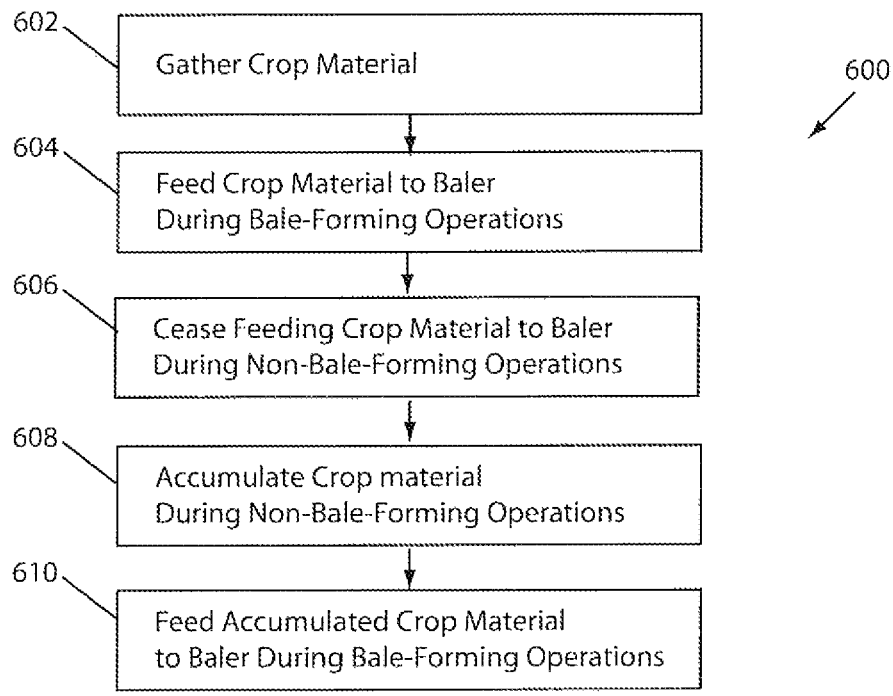
FIG. 8 shows a flow diagram of an example method of providing crop material to a round baler.

FIG. 8 shows an example flow diagram of a method 600 for a pickup conveyor 14 for use with a continuous baler 12 in which the baler 12 can be continuously moved through the field and operated through its various operational cycles without stopping and which allows for the continuous gathering of crop material 16. At block 602 crop material 16 is gathered by a pickup and provided to the conveyor 90. At block 604 the crop material 16 is fed to a baling chamber of a baler 12. For example, the conveyor 90 may be run in a feed direction to convey the crop material 16 to an inlet of a baling chamber 66. At block 606 the conveyor 12 may cease to provide the crop material 16 to baler during non-bale forming operations. For example the conveyor 90 may be stopped or run in a reverse direction. At block 608 crop material is accumulated on the conveyor 90 during non-bale forming operations of the baler. For example, the pickup 18 may continue to provide crop material 16 to the conveyor when the conveyor is operated is stopped or operated in a non-feed direction. This allows the baler 12 to be continuously pulled through the field as the pickup continues the gathering of the crop material 16. At block 610, the crop material is then fed into the baler 12. This allows for the accumulated crop material to be fed into the baler 12 for baling.

Figure 9:
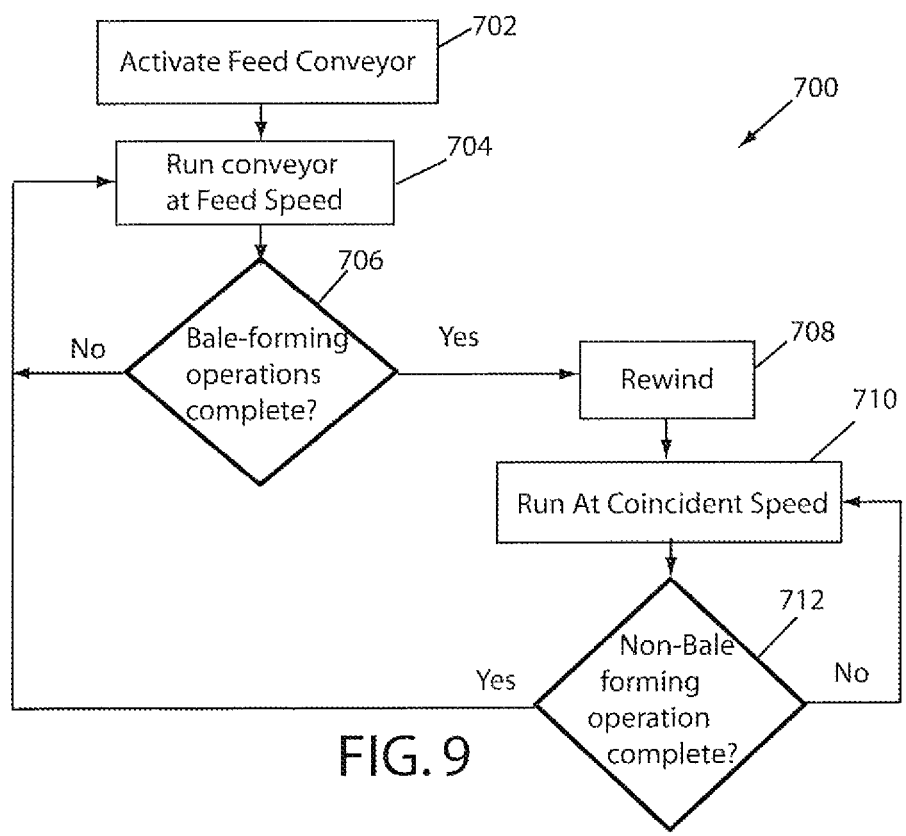
FIG. 9 shows a flow diagram of an example method of providing crop material to a round baler.

FIG. 9 shows an example embodiment of a method 700 of providing crop material 16 to a round baler. At block 702 the pickup conveyor 14 is activated. For example, as discussed above, an operator may use a user interface 500 to activate the pickup conveyor 14. At block 704 the conveyor is run in a feed direction at a first speed to convey crop material 16 to the baling chamber 66 of the baler. For example, the pickup 18 may provide crop material 16 to the conveyor 90 which in turn conveys it to the baling chamber 66 of the baler 12. In an example embodiment the feed of the conveyor belts 92 of the conveyor 14 may be 600 feet/minute. At block 704 a determination is made as to whether a bale-forming mode of the baler is complete. For example, the bale size sensor 68 may be used to determine whether the bale has reached a desired size for wrapping and ejection. If the bale has not reached the desired size, then the conveyor may continue operating at the feed speed. If the bale-forming mode is complete (such as where the bale has reached a desired size) the conveyor is reversed to an initialized condition. For example, the conveyor may be reversed such that a point of the conveyor belt 92 that is adjacent the inlet 110 of the baling chamber 66 when the bale-forming operation is completed, is moved to a point adjacent the pickup 18. At block 710 the conveyor is run at a coincident speed such that a point on the conveyor 90 located adjacent the pickup at the start of the non-bale-forming operation will be located adjacent the inlet 110 of the baling chamber upon completion of the non-bale-forming operation (and the start of a new bale-forming operation). At block 712 a determination is made whether the non-bale-forming mode is complete. If it is not complete, then the conveyor continues to be run at a coincident speed. If the non-bale forming mode is complete, then the conveyor is run at a feed rate at block 704.

It should be noted that, whereas three particular operation cycles, bale-forming, bale-wrapping, and bale ejection, have been discussed, the term "cycle" is meant to incorporate other existing or future operations that could be performed by a baler and is not limited to the afore-mentioned three cycles. Thus, many other cycles could be performed by the baler 12, and the conveyor 90 adjusted in response to the various cycles. Furthermore, for convenience the term "mode" has been used to describe the movement and operation of the conveyor 90. It should be noted that the conveyor may be manipulated during the various modes to change speed (including direction or zero speed) and that while in some example embodiments the conveyor mode corresponds with the operational cycles of the baler, other modes of operation could be employed independently of the baler cycles and the various modes of the conveyor may last for longer or shorter periods than the baler operational modes. Furthermore, for convenience the terms bale forming mode and non-bale forming mode may be used to indicate when the baler is forming a bale and when the baler is not forming a bale. Each of these modes may comprise multiple sub-modes. For example, the non-bale forming mode comprise a wrapping and/or ejection mode.

FIGS. 10 and 11A-11L show example embodiments of the operation of a continuous round baler 12 and will be discussed together. FIG. 11A shows a schematic of a continuous baler 12 and a pickup conveyor 14 including a pickup 18 and conveyor 90 in an initial condition prior to starting. The conveyor extends a length L between the pickup 18 and a baling chamber of the baler 12. In an example embodiment the length L may be greater than five feet such as around 10 feet. This provides sufficient surface area for the accumulation of crop material 16 of significant volume, such as alfalfa, which may later be fed into the baling chamber 66. Thus, unlike prior art baler in which a pickup 18 is placed adjacent to an inlet of a baling chamber, the pickup 18 of the example embodiment may be displaced from the baling chamber 66.

Figure 10:
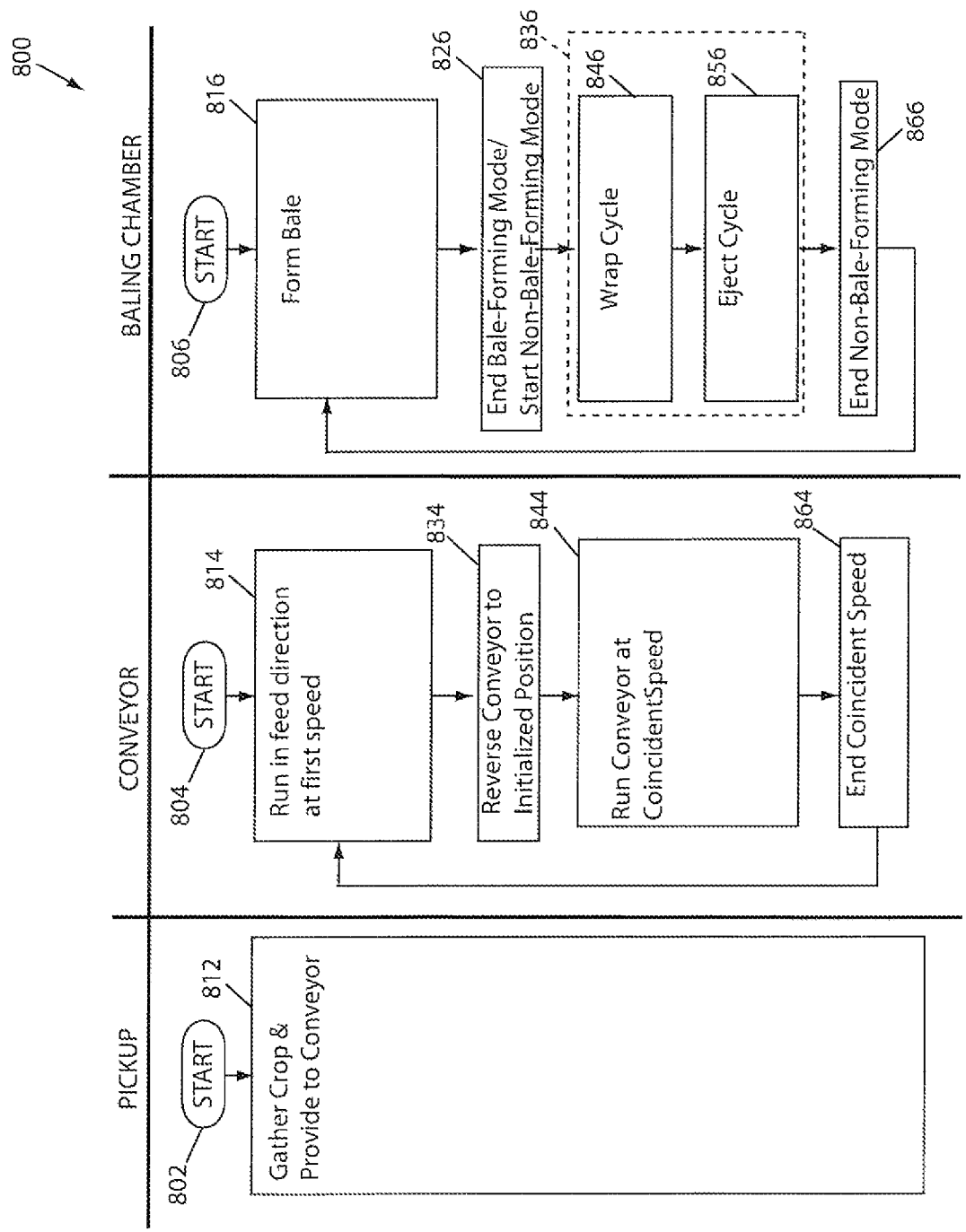
FIG. 10 shows a flow diagram of an example method of a continuous round baler.

The pickup 18, conveyor 90, and baling chamber 66 of the baler 12 are started at blocks 802, 804, and 806 respectively in FIG. 10. As shown in FIG. 10B and block 812 in FIG. 10 the pickup 18 rotates to provide crop material 16 to the conveyor 90. As shown in FIG. 11B and at block 814 the conveyor 90 is operated in a feed direction as shown by arrow. The baler 12 enters a bale forming mode (block 816). Thusly, crop material 16 is gathered by the pickup 18 and fed to the baling chamber 66 by the conveyor to form a bale 20 (FIGS. 11B-11F).

Once the bale 20 reaches a desired size, such as when the bale size sensor 69 indicates the bale is of sufficient size, the controller 70 ends the bale forming mode (FIG. 11G and block 826) and directs the conveyor to reverse to a initialized condition (FIGS. 11H and 11I and block 834). As shown in FIG. 11G, when the baler ends the bale-forming cycle, a point A on the conveyor is adjacent the baler 12 at the output end. As seen in FIGS. 11H and 11I, the conveyor 90 may be run in a reverse direction so that the point A of the conveyor belt 92 is positioned at the inlet 110 of the baling chamber 66, referred to as an initialized position. Thus the crop material 16 that is on the conveyor 90 when the bale-forming operation of the baler 12 is stopped is moved adjacent the pickup 18.

As seen in block 844 and FIGS. 11J and 11K, the conveyor may then be operated at a coincident speed during the Non-bale-forming operational cycles (block 836) of the baler 12, which in this example include a bale wrap cycle (block 846) and a bale ejection cycle (856). The coincident speed is the speed required for the point A on the conveyor 90 to move from the initialized position shown in FIG. 11I to a feed position adjacent the inlet of the baling chamber 66 shown in FIG. 11K during the Non-Bale Forming mode. Thus, when the Non-bale-forming mode ends (block 866) and/or a new Bale-forming mode begins the conveyor 90 ends the coincident speed (block 864) and runs at the feed speed of block 814 as the baler enters a new bale-forming mode (block 816). It should be noted that throughout these operations the pickup 18 may continue to provide crop material 16 to the conveyor 90 allowing the baler 12 to move continuously through the field collecting crop material 16.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A method of forming crop material into a bale with a baler, the baler having a pickup for picking up crop material from the ground and an accumulation conveyor extending from the pickup to an inlet of a bale forming chamber, the baler being configured to operate in a plurality of operational cycles, including bale-forming operational cycles and non-bale-forming operational cycles, the method comprising:

operating the pickup to place crop material onto the accumulation conveyor;

operating the accumulation conveyor in a feed direction at a first speed to convey crop material to the inlet of the bale forming chamber during a bale-forming operational cycle of the baler;

rewinding the accumulation conveyor to an initialized position in response to completion of said bale forming operational cycle and switching to a non-bale forming operational cycle so that a point on the conveyor proximate the inlet of the bale forming chamber at the completion of the bale-forming operational cycle is moved proximate the pickup; and operating the accumulation conveyor at a second speed in the feed direction during the non-bale-forming operational cycle of the baler such that said point on the conveyor is moved from proximate the pickup toward the inlet of the bale-forming chamber prior to starting the next non-bale forming operational cycle.

2. The method of claim 1, further comprising accumulating crop material on the accumulation conveyor during the non-bale-forming operation of the baler.

3. The method of claim 1, wherein the non-bale-forming operational cycle comprises a bale ejection cycle.

4. The method of claim 1, wherein the non-bale-forming cycle comprises a bale-wrapping cycle.

5. The method of claim 1, wherein the non-bale-forming cycle comprises a bale-wrapping cycle and a bale forming cycle.

6. The method of claim 1, wherein the second speed is slower than the first speed.

7. The method of claim 1, wherein a controller determines said first and second speeds.

8. The method of claim 1, wherein the pickup is configured to continuously provide crop material to the accumulation conveyor during both the bale-forming operational cycle and the non-bale-forming operational cycle.

9. The method of claim 1, wherein the accumulation conveyor comprises a conveyor belt having a portion extending forward of a baler frame of the baler.

10. The method of claim 1, wherein the second speed is such that the point on the accumulation conveyor proximate the pickup at the start of the non-baling operational cycle is located proximate the inlet of the bale forming chamber upon completion of the non-bale forming operational cycle.

* * * * *